US012335792B2

(12) United States Patent
Li et al.

(10) Patent No.: US 12,335,792 B2
(45) Date of Patent: Jun. 17, 2025

(54) RESOURCE PROCESSING METHOD AND APPARATUS, DEVICE AND STORAGE MEDIUM

(71) Applicant: GUANGDONG OPPO MOBILE TELECOMMUNICATIONS CORP., LTD., Guangdong (CN)

(72) Inventors: Haitao Li, Guangdong (CN); Ning Yang, Guangdong (CN)

(73) Assignee: GUANGDONG OPPO MOBILE TELECOMMUNICATIONS CORP., LTD., Guangdong (CN)

(*) Notice: Subject to any disclaimer, the term of this patent is extended or adjusted under 35 U.S.C. 154(b) by 311 days.

(21) Appl. No.: 17/879,501

(22) Filed: Aug. 2, 2022

(65) Prior Publication Data

US 2022/0369175 A1 Nov. 17, 2022

Related U.S. Application Data

(63) Continuation of application No. PCT/CN2020/078007, filed on Mar. 5, 2020.

(51) Int. Cl.
*H04W 36/00* (2009.01)
*H04W 28/26* (2009.01)

(52) U.S. Cl.
CPC ....... *H04W 36/0033* (2013.01); *H04W 28/26* (2013.01); *H04W 36/0085* (2018.08)

(58) Field of Classification Search
CPC ............. H04W 36/0033; H04W 28/26; H04W 36/0085; H04W 24/02; H04W 36/0005;

(Continued)

(56) References Cited

U.S. PATENT DOCUMENTS

2010/0304748 A1  12/2010  Henttonen et al.
2014/0378144 A1  12/2014  Legg et al.
(Continued)

FOREIGN PATENT DOCUMENTS

CN  107113673 A  8/2017
CN  107333293 A  11/2017
(Continued)

OTHER PUBLICATIONS

International Search Report (ISR) dated Dec. 16, 2020 for Application No. PCT/CN2020/078007.
(Continued)

*Primary Examiner* — Sudesh M Patidar
(74) *Attorney, Agent, or Firm* — Ladas & Parry LLP

(57) ABSTRACT

Embodiments of the present application provide a resource processing method and apparatus, a device, and a storage medium, where the method includes: when a terminal device accesses a network, generating first information including a handover report, and sending the first information, correspondingly, a source network device can receive at least one piece of first information sent by at least one terminal, and each piece of first information includes: a handover report of a corresponding terminal device. Therefore, the source network device can adjust, according to the handover report of the at least one terminal device, a reserved resource allocated by the network device, which further adjusts the coverage and the size of the resource pool reserved for the terminal device in conditional handover, which improves the matching degree between the reserved resources allocated tar the terminal device and the terminal device, solves the problem of resource waste or resource shortage.

12 Claims, 6 Drawing Sheets

(58) Field of Classification Search
CPC ......... H04W 36/0079; H04W 36/0055; H04W 36/00; H04W 36/08; H04W 36/30; H04W 36/0072; H04W 36/0058; H04W 36/00837; H04W 28/0226; H04W 28/0231; H04W 74/0838; H04W 74/0866

See application file for complete search history.

(56) References Cited

U.S. PATENT DOCUMENTS

| | | | | |
|---|---|---|---|---|
| 2019/0335374 | A1* | 10/2019 | Takehana | H04W 36/0085 |
| 2020/0045602 | A1 | 2/2020 | Jiang | |
| 2020/0077314 | A1* | 3/2020 | Hwang | H04W 76/27 |
| 2022/0022058 | A1* | 1/2022 | Fang | H04W 74/0833 |
| 2022/0167223 | A1* | 5/2022 | Shrestha | H04W 36/0061 |
| 2022/0191961 | A1* | 6/2022 | Qiu | H04W 76/20 |
| 2022/0295571 | A1* | 9/2022 | Da Silva | H04W 74/0866 |
| 2022/0369178 | A1* | 11/2022 | Liu | H04W 36/0058 |
| 2023/0103126 | A1* | 3/2023 | Liu | H04W 36/0058 370/311 |
| 2023/0171713 | A1* | 6/2023 | Vikram | H04W 56/001 370/329 |
| 2023/0262569 | A1* | 8/2023 | Cheng | H04W 36/30 370/331 |

FOREIGN PATENT DOCUMENTS

| | | |
|---|---|---|
| CN | 108632875 A | 10/2018 |
| CN | 109392039 A | 2/2019 |
| CN | 110351788 A | 10/2019 |
| CN | 110636567 A | 12/2019 |
| CN | 110831079 A | 2/2020 |
| EP | 3609231 A1 | 2/2020 |
| RU | 2421910 C2 | 6/2011 |
| WO | 2019158801 A1 | 8/2019 |
| WO | 2020029366 A1 | 2/2020 |

OTHER PUBLICATIONS

Written Opinion (WOSA) dated Dec. 16, 2020 for Application No. PCT/CN2020/078007.

Intel Corporation:'Discussion of conditional handover' 3GPP TSG RAN WG2 Meeting #103bis R2-1814051 Oct. 12, 2018.

Nokia, Nokia Shanghai Bell, CFRA resources update for Conditional Ho, R2-1909287, 3GPP TSG-RAN WG2 Meeting #107, Prague, Czechia, Aug. 26-30, 2019.

The first Office Action of corresponding Chinese application No. 202211014053.X,dated Aug. 12, 2023.

The first Office Action of corresponding European application No. 20923667.8, dated Sep. 18, 2023.

The first Office Action of corresponding Russian application No. 2022123604, dated Jul. 20, 2023.

Astri, TCL Communication Ltd., Discussion on Conditional Handover in Nr, R2-1802008, 3GPP TSG-RAN WG2 Meeting #101, Athens, Greece, Feb. 26-Mar. 2, 2018.

MediaTek Inc., Discussions on NR Conditional Handover Procedures, R2-1906482, 3GPP TSG-RAN WG2 Meeting #106, Reno, NV, USA, May 13-17, 2019.

The Notice of Allowance of corresponding Chinese application No. 202211014053.X, dated Mar. 28, 2024.

The first Office Action of corresponding Japanese application No. 2022-553206, dated Apr. 30, 2024.

CMCC, The Reporting of CHO failure, R2-1916276, 3GPP TSG-RAN WG2 Meeting #108, Reno, Nevada, USA, Nov. 18-22, 2019.

Nokia, Nokia Shanghai Bell, On RLF reporting for CHO and DAPS, R2-1915497, 3GPP TSG-RAN WG2 Meeting #108, Reno, USA, Nov. 18-22, 2019.

CATT (Rapporteur), Output of Email Discussion [107#45][NRSON] RACH and Mobility Robustness Optimisation Checking, R2-1912147, 3GPP TSG-RAN WG2 Meeting #107bis, Chongqing. P.R.China. Oct. 14-18, 2019.

Renesas Mobile Europe Ltd, Analysis of the new SON feature for detecting unnecessary IRAT HO from E-UTRAN to GERAN, GP-110746, 3GPP TSG GERAN#50, Dallas, Texas, USA, May 16-20, 2011.

Ericsson, RLF report contents in NR, R2-1910848, 3GPP TSG-RAN2 Meeting #107, Prague, Czech Republic, Aug. 26-30, 2019.

The EESR of corresponding European application No. 20923667.8, dated Dec. 20, 2022.

The second Office Action of corresponding Chinese application No. 202211014053.X, dated Nov. 1, 2023.

The first Office Action of corresponding Indian application No. 202217052751, dated Nov. 1, 2023.

The first Office Action of corresponding Israel application No. 296086, dated Feb. 18, 2025, 3 pages.

The extended European search report of No. 24199944.0, dated Dec. 18, 2024, 14 pages.

The first Office Action of corresponding Australia application No. 2020433128, dated Apr. 4, 2025.

* cited by examiner

RESOURCE PROCESSING METHOD AND APPARATUS, DEVICE AND STORAGE MEDIUM

CROSS REFERENCE TO RELATED APPLICATION

This application is a continuation of International Application No. PCT/CN2020/078007, filed on Mar. 5, 2020. The above application is hereby incorporated by reference in its entirety.

TECHNICAL FIELD

The embodiments of the present application relate to the field of communication technologies, and in particular, to a resource processing method and apparatus, a device, and a storage medium.

BACKGROUND

In the 5G new radio (5G NR) system, a conditional handover has been developed. During the conditional handover process, the terminal device no longer executes the handover immediately after receiving the handover command, but executes the handover after the condition attached to the handover command is satisfied, so that the problem of handover failure caused by the rapid change of the channel state can be avoided to a certain extent.

In the prior art, in the process of executing the conditional handover by the terminal device, the source base station configures random access resources provided by multiple potential target cells for the terminal device, and sends the access configuration information of the multiple potential target cells to the terminal device. In this way, after receiving the access configuration information of the multiple potential target cells, the terminal device does not execute the cell handover immediately, but continues to measure the signal quality of the potential target cells during the moving process, and judges whether the activation condition of the conditional handover is satisfied. When the activation condition is satisfied, that is, within the validity period of the conditional handover, if the signal quality of a potential target cell, is better than that of the currently connected cell and the difference between the two is greater than a preset threshold, the potential target cell is selected for the cell handover.

However, when choosing to execute the conditional handover, the source base station will randomly reserve random access resources for the terminal device based on the received access resources of the multiple potential target cells. This leads to the problem of resource waste due to too many reserved resources, and there may also be a problem of no suitable resource for the terminal device to use due to too few reserved resources. That is, the existing conditional handover method has the problem of inappropriate reservation of resources, resulting in resource waste or resource shortage.

SUMMARY

The embodiments of the present application provide a resource processing method and apparatus, a device, and a storage medium, which solves the problem of resource waste or resource shortage due to inappropriate handover cell resources reserved by the source base station for the terminal device.

In a first aspect, an embodiment of the present application provides a resource processing method, which is applied to a terminal device, and the method includes:
generating first information, where the first information includes: a handover report of the terminal device, and sending the first information, where the first information is used for a source network device of the terminal device to adjust a reserved resource according to the handover report.

In a second aspect, an embodiment of the present application provides a resource processing method, which is applied to a network device, and the method includes:
acquiring at least one piece of first information sent by at least one terminal device; where each piece of first information includes: a handover report of a corresponding terminal device; and
adjusting a reserved resource allocated by the network device according to the handover report of the at least one terminal device.

In a third aspect, an embodiment of the present application provides a resource processing apparatus, including: a processing module and a sending module;
the processing module is configured to generate first information, where the first information includes: a handover report of a terminal device;
the sending module is configured to send the first information; where the first information is used for a source network device of the terminal device to adjust a reserved resource according to the handover report.

In a fourth aspect, an embodiment of the present application provides a resource processing apparatus, including: an acquiring module and a processing module;
the acquiring module is configured to acquire at least one piece of first information sent b at least one terminal device; where each piece of first information includes: a handover report of a corresponding terminal device;
the processing module is configured to adjust a reserved resource allocated by the network device according to the handover report of the at least one terminal device.

In a fifth aspect, an embodiment of the present application provides a terminal device, including:
a processor, a memory, a transmitter, and an interface to communicate with a network device;
the memory stores computer-executable instructions;
the processor executes the computer-executable instructions stored in the memory, enabling the terminal device to execute the method according to the first aspect above.

In an embodiment, the above-mentioned processor may be a chip.

In a sixth aspect, an embodiment of the present application provides a network device, including:
a processor, a memory, a receiver, and an interface to communicate with a terminal device;
the memory stores computer-executable instructions;
the processor executes the computer-executable instructions stored in the memory, enabling the network device to execute the method according to the second aspect above.

In an embodiment, the above-mentioned processor may be a chip.

In a seventh aspect, an embodiment of the present application provides a computer-readable storage medium, where computer-executable instructions are stored in the computer-readable storage medium, and when the computer-executable instructions are executed by a processor, are used to implement the method according to the first aspect above.

In an eighth aspect, an embodiment of the present application provides a computer-readable storage medium, where computer-executable instructions are stored in the computer-readable storage medium, and when the computer-executable instructions are executed by a processor, are used to implement the method according to the second aspect above.

In a ninth aspect, an embodiment of the present application provides a program for executing the method described in the first aspect when the program is executed by a processor.

In a tenth aspect, an embodiment of the present application provides a program for executing the method described in the second aspect when the program is executed by a processor.

In an eleventh aspect, an embodiment of the present application provides a computer program product, including program in where the program instructions are used to implement the method described in the first aspect.

In a twelfth aspect, an embodiment of the present application provides a computer program product, including program instructions, where the program instructions are used to implement the method described in the second aspect.

In a thirteenth aspect, an embodiment of the present application provides a chip, including: a processing module and a communication interface, where the processing module can execute the method described in the first aspect.

Further, the chip further includes a storage module (e.g. a memory), the storage module is used for storing instructions, the processing module is used for executing the instructions stored in the storage module, and the execution of the instructions stored in the storage module enables the processing module to execute the method described in the first aspect.

In a fourteenth aspect, an embodiment of the present application provides a chip, including: a processing module and a communication interface, where the processing module can execute the method described in the second aspect.

Further, the chip further includes a storage module (e.g. a memory), the storage module is used for storing instructions, the processing module is used for executing the instructions stored in the storage module, and the execution of the instructions stored in the storage module enables the processing module to execute the method described in the second aspect.

A fifteenth aspect of the present application provides a communication system, including a network device and a terminal device;

the terminal device is the apparatus described in the third aspect, and the network device is the apparatus described in the fourth aspect.

The resource processing method and apparatus, the device, and the storage medium provided by the embodiments of the present application can send the generated first information including the handover report when the terminal device accesses the network, enables the source network device to adjust the coverage and size of the resource pool reserved for the terminal device in the conditional handover by receiving and analyzing the handover report of the terminal device, which improves the matching degree between the reserved resources allocated for the terminal device and the terminal device, reduces the allocation probability of the inappropriate resources, and solves the problem of resource waste or resource shortage.

DESCRIPTION OF EMBODIMENTS

In order to make the purposes, technical solutions and advantages of the embodiments of the present application clearer, the technical solutions in the embodiments of the present application will be described clearly and completely below with reference to the drawings in the embodiments of the present application. Obviously, the described embodiments are a part of the embodiments of the present application, but not all of the embodiments. Based on the embodiments in the present application, all other embodiments obtained by those of ordinary skill in the art without creative efforts shall fall within the protection scope of the present application.

The terms "first", "second" and the like in the description, claims and the above-mentioned drawings of the embodiments of the present application are used to distinguish similar objects, and are not necessarily used to describe a specific sequence or sequence. It is to be understood that data so used may be interchanged under appropriate circumstances such that the embodiments of the application described herein can be practiced in sequences other than those illustrated or described herein. Furthermore, the terms "comprising" and "having" and any variations thereof, are intended to cover non-exclusive inclusion, for example, a process, method, system, product or device comprising a series of steps or units is not necessarily limited to those expressly listed, but those steps or units may include other steps or units not expressly listed or inherent to the process, method, product or device.

Figure 1:
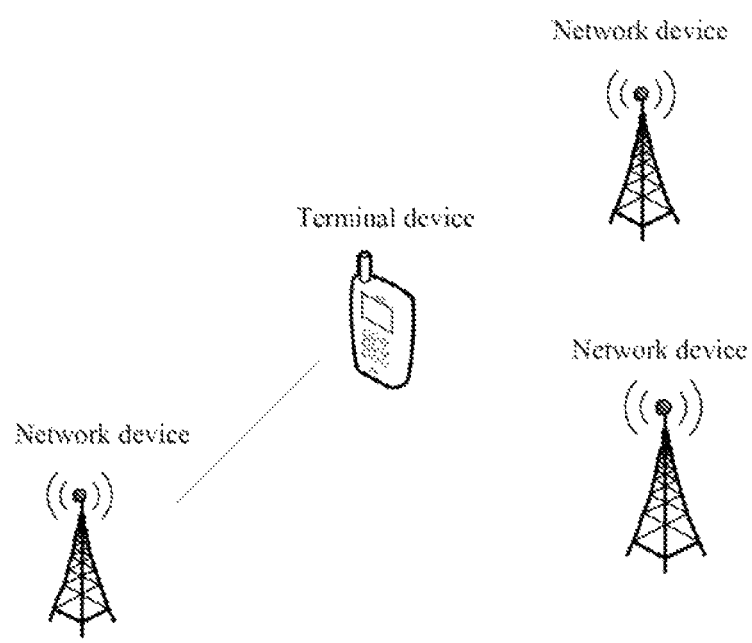
FIG. 1 is a schematic diagram of a communication system to which an embodiment of the application is applied.

FIG. 1 is a schematic diagram of a communication system to which an embodiment of the present application is applied. As shown in FIG. 1, the communication system may include a terminal device and a network device. It can be understood that, in an actual communication system, the number of the terminal device and the network device may be one or more, FIG. 1 exemplarily shows one terminal device and three network devices.

In an embodiment, the communication system may include multiple network devices, and the coverage of each network device may include other number of terminal devices. The embodiments of the present application do not limit numbers of network devices and terminal devices in the communication system.

It can be understood that FIG. 1 is only a schematic diagram, and the communication system may also include other network devices, such as a core network device, a wireless relay device, and a wireless backhaul device, or may include other network entities such as a network controller and a mobility management entity, the embodiments of the present application are not limited to this.

The technical solutions of the embodiments of the present application can be applied to various communication systems, such as: a global system of mobile communication (GSM) system, a code division multiple access (CDMA) system, a wideband code division multiple access (WCDMA) system, a general packet radio service (GPRS), long term evolution (LIE) system, a LTE frequency division duplex (FDD) system a LIE time division duplex (TDD) system, advanced long term evolution (LTE-A) system, a new radio (NR) system, a NR system evolution system, an LTE-based access to unlicensed spectrum (LTE-U) system, a NR-based access to unlicensed spectrum (NR-U) system, a universal mobile telecommunication system (UMTS), a worldwide interoperability for microwave access (WiMAX) communication system, wireless local area networks (WLAN), wireless fidelity (WiFi), a next-generation communication system or other communication systems, etc.

Generally speaking, traditional communication systems support a limited number of connections and are easy to implement. However, with the development of communication technology, mobile communication systems will not only support traditional communications, but will also support, for example, device to device (D2D) communication, machine to machine (M2M) communication, machine type communication (MTC), vehicle to vehicle (V2V) communication and so forth. The embodiments of the present application can also be applied to these communication systems.

The system architecture and service scenarios described in the embodiments of the present application are for the purpose of illustrating the technical solutions of the embodiments of the present application more clearly, and do not constitute limitations on the technical solutions provided by the embodiments of the present application. Those of ordinary skill in the art know that with the evolution of the architecture and the emergence of new business scenarios, the technical solutions provided in the embodiments of the present application are also applicable to similar technical problems.

The network device involved in the embodiments of the present application may be a common base station (such as a NodeB or eNB or gNB), a new radio controller (new radio controller, NR controller), a centralized unit, a new radio base station, a remote radio module, a micro base station, a relay, a distributed unit, a transmission reception point (TRP), a transmission point (TP) or any other devices. The embodiments of the present application do not limit the specific technology and specific device form adopted by the network device. For the convenience of description, in all the embodiments of this application, the above-mentioned apparatuses for providing wireless communication functions far the terminal device are collectively referred to as the network device.

In this embodiment of the present application, the terminal device may be any terminal, for example, the terminal device may be a user device of machine type communication. That is to say, the terminal device may also be called as a user device (UE), mobile station (MS), a mobile terminal, a terminal, etc. The terminal device may communicate with one or more core networks via a radio access network (RAN). For example, the terminal device may be a mobile phone (or a "cellular" phone), a computer with a mobile terminal, etc. For example, the terminal device may also be portable, pocket-sized, hand-held, computer built-in or vehicle-mounted mobile devices that exchange language and/or data with a wireless access network. There is no specific limitation in the embodiments of the present application.

In an embodiment, the network device and the terminal device can be deployed on land, including indoor or outdoor, handheld or vehicle-mounted; they can also be deployed on water; they can also be deployed on aircraft, balloons and artificial satellites in the air. The embodiments of the present application do not limit the application scenarios of the network device and the terminal device.

In an embodiment, the communication between the network device and the terminal device and between the terminal device and the terminal device can be performed through licensed spectrum, or through unlicensed spectrum, or through licensed spectrum and unlicensed spectrum at the same time. The communication between the network device and the terminal device and between the terminal device and the terminal device can be carried out through the spectrum below 7 gigahertz (GHz), or through the spectrum above 7 GHz, or through the spectrum below 7 GHz and the spectrum above 7 GHz at the same time. The embodiments of the present application do not limit the spectrum resource used between the network device and the terminal device.

Exemplarily, in the scenario shown in FIG. 1, in the application process of the terminal device, for some special scenarios, for example, the terminal device is on a high-speed moving vehicle, or under high-frequency conditions, the terminal device needs to frequently execute the handover between different access devices. Different access devices are also called access points, access network devices, network devices, etc., that is, the cell that the terminal device needs to execute the handover of the access cell during the application process.

Figure 2:
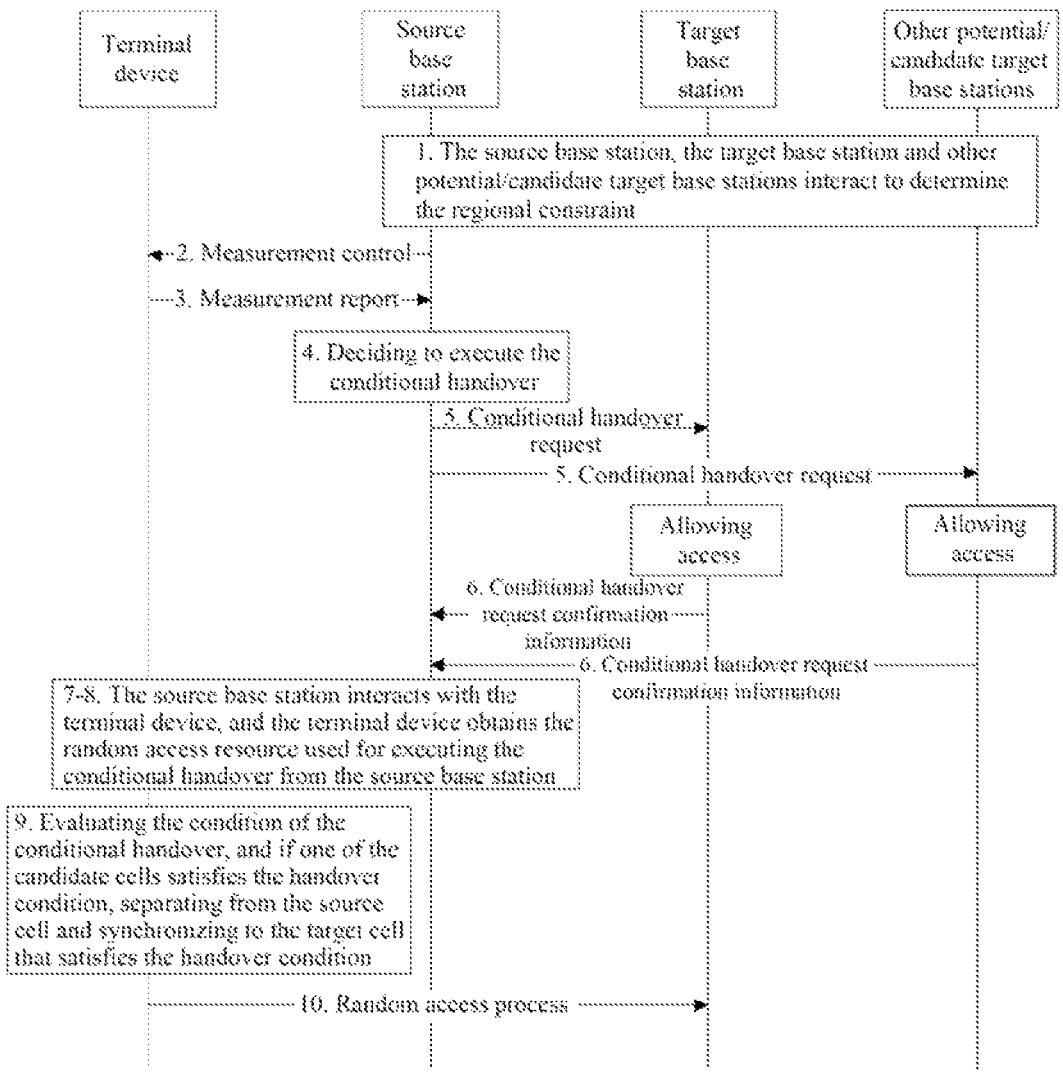
FIG. 2 is a schematic flowchart of an existing conditional handover method.

Currently, in 5G NR, the specific implementation of the conditional handover (CHO) is provided. Exemplarily, FIG. 2 is a schematic flowchart of an existing conditional handover method. The figure illustrates the interaction between the terminal device, the source base station, the target base station and other potential/candidate target base stations. As shown in FIG. 2, the steps of the existing conditional handover are as follows:

1, the source base station, the target base station and other potential/candidate target base stations interact to determine the regional constraint.

2-3, the terminal device executes channel and other measurement tasks based on the measurement control indication of the source base station, and reports the corresponding measurement report.

4, the source base station decides to execute the conditional handover based on the received measurement report.

5-6, the source base station interactively negotiates with the target base station and other potential/candidate target base stations to obtain access configuration information of multiple potential target cells.

Specifically, the source base station sends a conditional handover request to the target base station and other potential/candidate target base stations. When the target base station and other potential/candidate target base stations determine that the access is allowed, they feed back the conditional handover request confirmation information to the source base station, thereby obtaining multiple pieces of access configuration information of the potential target cells, e.g., random access resources.

In an embodiment, the random access resource is, for example, a contention free dedicated random access preamble, and a cell-radio network temporary identifier (C-RNTI).

7-8, the source base station interacts with the terminal device, and the terminal device obtains the random access resource used for executing the conditional handover from the source base station.

9, the terminal device evaluates the condition of the conditional handover, and if one of the candidate cells satisfies the handover condition, the terminal device separates from the source cell and synchronizes to the target cell that satisfies the handover condition.

10, the terminal device executes the random access process.

It is understood that in CHO, the terminal device can obtain the relevant access configuration information of at least one potential target cell, and after receiving the relevant access configuration information of at least one potential target cell, it does not immediately execute the conditional handover to access the network, instead, it continues to measure the signal quality of the reference signal of the potential target cell during the moving process, and judges whether the activation condition of the conditional handover is satisfied. Only when the activation condition is satisfied, the terminal device will select a target cell for access.

In an embodiment, the activation condition is that the reference signal receiving power (RSRP) of the potential target cell is continuously higher than that of the source serving cell within a certain period of time (time-to-trigger, that is, before the timer expires), and the difference between the two is only greater than a preset network configuration threshold.

Then in this solution, when the terminal device chooses to execute the conditional handover, the source base station will randomly reserve random access resources for the terminal device based on the access resources obtained from multiple potential target cells. Too many resources are reserved, which leads to resource waste, and there may also be a problem that there is no suitable resource for the terminal device to use due to too few reserved resources.

Exemplarily, if the source base station uses the too many access resources provided by potential target base stations as the reserved resources of the terminal device, since the terminal device only uses the resources provided by one potential target base station, the resources of other potential target base stations will be unreasonable wasted, then the random access process of other terminals covered by the above-mentioned multiple potential target base stations (for example, the normal access may not be possible because dedicated access preamble resources are exhausted).

Exemplarily, if the source base station does not reserve appropriate access resources provided by the potential target base station, then the terminal device has to execute the random access on the inappropriate resources provided by the potential target base station, which may possibly lead to handover failure or resource conflict.

To sum up, it can be seen that the existing conditional handover method has the problem of inappropriate reservation of resources, resulting in resource waste or resource shortage.

At present, in 5G NR, processing strategies have been formulated for some scenarios where terminal device fails to execute cell handover based on the traditional handover. For example, scenarios of the cell handover failure may include a too late handover scenario, a premature handover scenario, a wrong cell handover scenario, and the like of the terminal. The following describes the processing strategies after traditional handover failures for different scenarios.

In the too late handover scenario:
the terminal device initiates a re-establishment request to the target cell, and after the re-establishment is completed, the target base station to which the target cell belongs will ask the terminal device whether there is a radio link failure (RLF) information report that needs to be reported. Correspondingly, if the terminal device fails to execute the traditional handover before the re-establishment, it will send the RLF information report to the target base station. In this way, the target base station will then send the RLF information report received from the terminal device to the source base station of the terminal device corresponding to the source serving cell (exemplarily, sent over an Xn interface). The source base station can aggregate the RLF information reports of multiple terminal devices and adjust the related parameters of the traditional handover, thereby optimizing the handover process.

In the premature handover scenario:
when the terminal device executes traditional handover prematurely, because the terminal device is currently far away from the target base station, the air interface link between the terminal device and the target base station is unstable, which may lead to two bad results: first, the random access executed by the terminal device oriented to the target base station is not successful, the random access response sent by the target base station cannot be received by the terminal device, and the random access cannot be completed when a T304 timer expires. Among them, the T304 timer is a timer used when the handover is executed within the system if the terminal device cannot complete the corresponding handover process within the duration of the T304 timer, it will execute a corresponding resource fallback, and initiate a radio resource control (RRC) connection re-establishment process; second, after the terminal device completes the random access with the he target base station, the air interface communication with the target base station is unstable, resulting in RLF.

Therefore, when the terminal device is in a premature handover scenario, the terminal device will complete the reestablishment process with the source base station, and after accessing the serving cell of the source base station, send an RLF information report to the source base station. In this way, the source base station can aggregate reports from multiple terminal devices and adjust the relevant parameters of the traditional handover, thereby optimizing the handover process.

In the wrong cell handover scenario:
in the case that the terminal device wrongly executes the handover to a certain cell (the terminal device only stays in the cell for a short time), after the terminal device leaves the cell quickly, the air interface link quality with the cell deteriorates, and the RLF is declared. At this time, the terminal device has to execute the cell reselection and execute the random access on the new cell.

After accessing a new cell, the terminal device can report the RLF information report. The RLF information report can include the ID of the resident cell where the RLF occurs and the cell where the terminal device is located when the handover command (RRC configuration information) is received, etc., in this way, the base station to which the terminal device finally accesses can infer that the terminal device experiences a handover to the wrong cell, and sends the RLF information report to the source base station. In this way, the source base station can also aggregate reports from multiple terminal devices, and adjust the relevant parameters of the traditional handover, thereby optimizing the handover process.

In an embodiment, in view of the problem of resource waste or resource shortage due to inappropriate reservation of resources in the existing conditional handover method, combined with the processing strategies formulated based on some scenarios where the cell handover execution of traditional handover fails in 5G NR the embodiments of the present application provide a resource processing method, and the overall idea is as follows: after executing a process of network handover, the terminal device generates first information including a handover report of the terminal device, and sends the first information. In this way, the source network device of the source serving cell where the terminal device is located can obtain the first information sent by the multiple terminal devices, analyze the handover rule of the terminal device according to the handover report in the first information, and then adjust the resource reserved for the terminal device to execute the conditional handover.

Hereinafter, the technical solutions of the present application will be described in detail through specific embodiments. It should be noted that the technical solution of the present application may include part or all of the following contents, the following specific embodiments may be combined with each other, and the same or similar concepts or processes may not be repeated in some embodiments.

Figure 3:
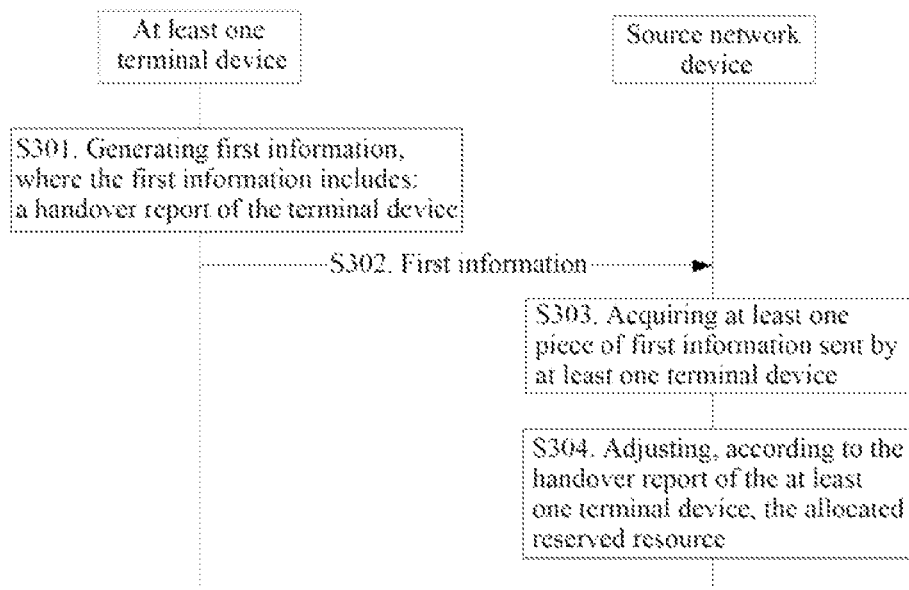
FIG. 3 is an interactive schematic diagram of a first embodiment of the resource processing method provided by an embodiment of the present application.

FIG. 3 is an interactive schematic diagram of a first embodiment of the resource processing method provided by an embodiment of the present application. The method is explained by the information exchange between at least one terminal device and the source network device. The following describes the interaction between one terminal device of the at least one terminal device and the source network device. The implementation solutions of other terminal devices are similar, and are not described in detail in this embodiment. Referring to FIG. 3, the resource processing method may include the following steps:

S301, the terminal device generates first information, where the first information includes: a handover report of the terminal device.

In the embodiment of the present application, when the terminal device accesses the network, the first information may be generated based on the handover report of the terminal device and the like.

In practical applications, since there are many ways for the terminal device to access the network, in order for the source network device to know the handover mode of the terminal device the terminal device can indicate, through the handover type indication information, the handover mode for the terminal device to access the network.

In a possible design of the present application, the handover report of the terminal device includes: handover type indication information. In this possible design, after the terminal device determines the handover type indication information, the handover type indication information may be included in the handover report. At this time, the handover type indication information and the handover report are in an inclusion relationship in the first information. That is, the carrier of the handover type indication information is the handover report, and the carrier of the handover report is the first information.

In another possible design of the present application, the first information generated by, the terminal device further includes: handover type indication information. In this possible design, the handover type indication information is included in the first information. At this time, the relationship between the handover type indication information and the handover report are in a coexisting relationship in the first information. That is, the carriers of both the handover type indication information and the handover report are the first information.

In any of the above possible designs, a handover mode indicated by the handover type indication information is one of the following:
a conditional handover mode and an unconditional handover mode;
or
the handover mode indicated by the handover type indication information is one of the following:
a traditional handover mode and a non-traditional handover mode.

Exemplarily, in practical applications, the terminal device can access the target cell in a variety of ways, the handover mode can be divided into a conditional handover mode or an unconditional handover mode according to whether it is a conditional handover mode; the handover method can be divided into a traditional handover mode or a non-traditional handover mode according to whether it is a traditional handover mode.

In an embodiment, in practical applications, there is a handover mode that is a contention based random access (CBRA) mode. When accessing the network based on the resource reserved by the source network device in the CBRA mode, the CBRA mode can be attributed to the conditional handover mode when the accessing the network without using the resource reserved by the source network device in the CBRA mode, the CBRA mode can be attributed to the traditional handover mode.

It can be understood that the resource reserved by the source network device may be determined by the source network device based on the access resources provided by multiple potential target cells. Therefore, the above-mentioned reserved resources may be all the access resources provided h all potential target cells, may be part of the access resources provided by all potential target cells, may be all the access resources provided by part of the potential target cells, or may be part of the access resources provided by part of the potential target cells. The specific implementation of the reserved resource may be determined by the source network device based oar an actual scenario, which will not be repeated here.

Exemplarily, when the terminal device executes a conditional handover, selects a target cell among the multiple potential target cells determined by the source network device, and success ally accesses the network based on the resources reserved by the source network device for the terminal device, the action of the terminal device generating and reporting the first information is triggered by the behavior of the conditional handover itself.

In an embodiment, when the terminal device accesses the network based on an unconditional handover mode, for example, when the terminal device accesses the network through a radio resource control (RRC) re-establishment mode the action of the terminal device generating and reporting the above first information is triggered by a radio link failure (RLF) behavior. In this case, the handover report included in the first information may be an information enhancement of the existing RLF report, that is, the first information includes both the information of the existing RLF report and the information about CHO.

In an embodiment of the present application, the above handover report includes at least one of the following items:
1, a C-RNTI allocated by a source serving cell of the terminal device for the terminal device;
   the C-RNTI is used to uniquely identify the terminal device under the air interface of the source serving cell. It should be noted that the C-RNTI is valid only when the terminal device is in a connected state.
2, an identifier of the source serving cell of the terminal device;
   in this embodiment, by including the identifier of the source serving cell in the handover report, the network device that receives the first information can determine the source serving cell of the terminal device.
3, measurement information of multiple potential target cells up to the moment of handover, or measurement information of a cell on a configured NR frequency up to the moment of handover.

In an embodiment, the up to the moment of handover may be interpreted as from the moment terminal device receives the handover instruction up to the moment to execute CHO. Exemplarily, the duration corresponding to the up to the moment of handover may be the validity period of the timer in the system.

Before executing the cell handover, the terminal device continuously monitors the measurement information of multiple potential target cells allocated by the source network device, or the measurement information of the cells on the NR frequency configured by the source network device for the terminal device. In this way, the network device receiving the first information can obtain the measurement information of the cell monitored by the terminal device before the handover is executed, which provides a reference for the subsequent adjustment of the reserved resource.

Exemplarily, the measurement information includes at least one item listed below:
3.1, the signal quality of the cell and the corresponding cell identifier;
3.2, the identifiers of N cells with the best signal quality, where N is an integer greater than or equal to 1;
3.3, the identifiers and signal quality of the cells sorted from high to low according to the maximum value of the signal quality.

In an embodiment, when the terminal device executes signal quality measurement on multiple cells, the cells may be all cells in the multiple potential target cells, or may be the cells on the above configured NR frequency.

In a possible design, the terminal device may include the measured signal quality of all cells and the corresponding cell identifiers into the handover report;

In another possible design, the terminal device may select N cells from all the measured cells to include in the handover report.

In yet another possible design, the terminal device may also sort the maximum values of the measured signal quality of all cell in a descending order, and include the identifiers and signal quality of the sorted cells in the handover report.

In an embodiment of the present application, the signal quality includes at least one of the following items:
Reference signal receiving power (RSRP), reference signal receiving quality (RSRQ) and a signal to interference plus noise ratio (SINR).

It can be understood that, in addition to one or more of the foregoing RSRP, RSRQ, and SINR, the signal quality may also be other parameters used to express the channel quality, which is not limited in the embodiments of the present application. In an embodiment, the unit of the parameter representing the signal quality may be dB or dBm.

S302, the terminal device sends the first information, where the first information is used for the source network device of the terminal device to adjust a reserved resource according to the handover report.

In the embodiment of the present application, after accessing the network, the terminal device can send the generated first information. Exemplarily, when the terminal device executes the handover from the source serving cell to the target cell, the source serving cell is a cell served by the source network device, and the target cell is a cell served by the target network device. At this time, the terminal device can send the first information to the target network device, so that the source network device of the terminal device acquires the first information.

In an embodiment, if the target cell and the source serving cell belong to the same network device, the above-mentioned target network device and the source network device are the same network device. At this time, the terminal device can directly send the generated first information to the source network device.

In an embodiment, if the target cell and the source serving cell belong to different network devices, that is, when the target network device and the source network device are different network devices, the terminal device may first send the generated first information to the target network device, the target network device then forwards the first information to the source network device.

S303, the source network device acquires at least one piece of first information sent by at least one terminal device.

Among them, each piece of first intimation includes: a handover report of a corresponding terminal device.

In an embodiment of the present application, the source network device of the terminal device may directly or indirectly acquire the at least one piece of first information of the at least one terminal device.

Exemplarily, when the source serving cell and the target cell of the terminal device belong to the same network device, the source network device may directly acquire the above-mentioned at least one piece of first information from the at least one terminal device.

Exemplarily, when the source serving cell and the target cell of the terminal device do not belong to the same network device, S303 may be implemented by the following steps:
   receiving at least one piece of first information forwarded by at least one target network device, where the at least one target network device is an access network device of the corresponding terminal device in the at least one terminal device.

Specifically, since the terminal device will send the generated first information to the target network device to which the target cell belongs, the target network device will then send the first information of each terminal device to the source network device, that is, the source network device can acquire at least one first piece of first information of the at least one terminal device through the at least one target network device.

For the specific content included in the first information, reference may be made to the foregoing S301 and the descriptions in the following embodiment shown in FIG. 4, which will not be repeated here.

S304, the source network device adjusts, according to the handover report of the at least one terminal device, the allocated reserved resource.

In an embodiment of the present application, the source network device may analyze the acquired at least one piece of first information, determine the handover rule of the at least one terminal device, and then adjust, according to the handover rule, the reserved resource allocated for the terminal device.

For the specific implementation of this step, reference may be made to the description in the embodiment shown in FIG. 4 below, which will not be repeated here.

In the resource processing method provided by the embodiment of the present application, when executing the network handover, each terminal device can generate the first information including the handover report and send it out. In this way, the source network device of the terminal device can obtain the first information of the at least one terminal device, analyzes the handover rule of the terminal device according to the handover report in the first information, and then adjusts the resource reserved for the terminal device to execute the conditional handover. In this technical solution, the source network device can summarize the handover rule of the terminal device by analyzing the handover report of the terminal device, and adjust the allocated reserved resource based on the handover rule, which can reduce the allocation of the unnecessary resource, reduce the coverage and size of the resource pool used by the terminal device, provide suitable access resource tier the terminal device, and avoid the problem of resource waste or resource shortage caused by inappropriate resource reservation in existing conditional handover methods.

Figure 4:
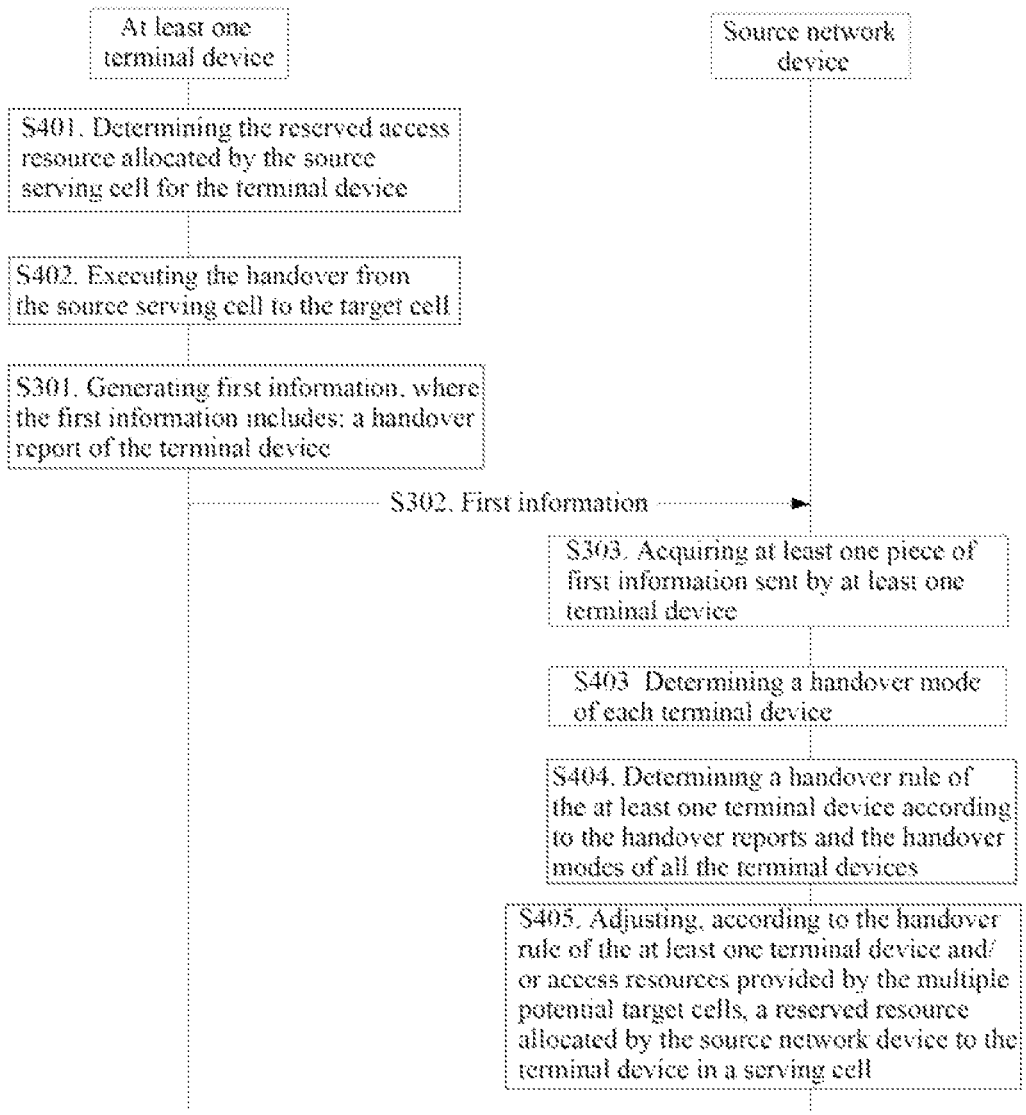
FIG. 4 is an interactive schematic diagram of a second embodiment of the resource processing method provided by an embodiment of the present application.

On the basis of the foregoing embodiment, FIG. 4 is an interactive schematic diagram of a second embodiment of the resource processing method provided by an embodiment of the present application. Referring to FIG. 4, in this embodiment, before the above S301, the method may further include the following steps:

S401, the terminal device determines the reserved access resource allocated by the source serving cell fir the terminal device.

The reserved access resources are access resources provided by multiple potential target cells.

In the embodiment of the present application, before the terminal device executes the network handover, the network device currently accessed by the terminal device, that is, the source network device may determine, according to the measurement result reported by the terminal device, for example, the motion track or location of the terminal device, by interacting with the network devices corresponding to multiple potential cells, multiple potential target cells that can provide the access resources for the terminal device; then interactively negotiate with the network devices corresponding to the multiple potential target cells to acquire the access resources provided b the multiple potential target cells; further allocate, based on the access resources provided by the multiple potential target cells, the reserved access resources to the terminal device, so that the terminal device can use the reserved access resources when executing the network handover.

S402, the terminal device executes the handover from the source serving cell to the target cell.

The source serving cell is a cell served by the source network device, and the target cell is a cell served by the target network device.

In an embodiment, after acquiring the reserved access resources allocated by the source serving cell, the terminal device may execute the network handover according to the actual scenario, and then access the target cell from the source serving cell.

Exemplarily, in the embodiments of the present application, the terminal device may access the target cell based on multiple handover modes, as follows:

as an example, S402 can be implemented by the following steps:

executing, based on the above reserved access resources, the handover from the source serving cell to the target cell in a conditional handover mode.

In this embodiment, when receiving the handover instruction from the source network device and the trigger condition of the conditional handover is met, the terminal device can execute the handover from the source serving cell to the target cell in a conditional handover mode based on the reserved access resources allocated by the source serving cell.

As another example, the S402 can be implemented by the following steps:

executing the handover from the source serving cell to the target cell in a CBRA mode, wherein the target cell is a cell with signal quality higher than or equal to a preset signal quality threshold.

In the embodiment of the present application, before executing the handover, the terminal device acquires measurement information of multiple potential target cells or measurement information of a cell on a configured. NR frequency, and then determines the target cell.

It can be understood that the target cell may be one of the above-mentioned multiple potential target cells, or may not belong to the above-mentioned multiple potential target cells, as long as the terminal device executes the handover from the source serving cell to the target cell through the CBRA mode, regardless of whether the target cell belongs to the multiple potential target cells, the signal quality of the target cells needs to be higher than or equal to the preset signal quality threshold.

In a possible design of this embodiment, when the target cell is one of multiple potential target cells, the target cell satisfies at least one of the following conditions.

signal quality of a synchronization signal block SSB or a channel state information reference signal CSI-RS reference signal corresponding to an unreserved resource in the target cell is higher than or equal to a preset signal quality threshold; and signal quality of an SSB or a CSI-RS reference signal corresponding to a reserved resource in the target cell is less than the preset signal quality threshold.

The full English spelling of the SSB is synchronization signal and physical broadcast channel block, the synchronization signal and PBCH block, referred to as the synchronization signal block, and the full English spelling of the CSI-RS is channel state information reference signal.

In the embodiment of the present application, if the target cell that the terminal device successfully accesses through the CBRA is one of multiple potential target cells, there may be a situation that when the timer the terminal device expires, the signal quality of the SSB or the CSI-RS reference signal corresponding to the unreserved resource in the target cell is higher than or equal to a preset signal quality threshold, or, the signal quality of the SSB or the CSI-RS reference signal corresponding to the reserved resource in the target cell is less than the preset signal quality threshold, that is, the terminal device cannot directly access one of the multiple potential target cells based on the reserved access resources allocated by the source serving cell.

It can be understood that the conditions met by the target cell can also be interpreted as follows: there is no reserved resource on the beam of the target cell with the air interface quality higher than the air interface quality threshold, while the air interface quality of the beam corresponding to the reserved resources is less than the air interface quality threshold.

As another example, S402 can be implemented by the following steps:

accessing the target cell in a RRC re-establishment mode.

In an embodiment, accessing the target cell in the RRC re-establishment mode means that the terminal device fails to execute the network handover. At this time, the terminal device needs to access the network again through the re-establishment mode.

Exemplarily, in a possible design of the present application, before the terminal device accesses the target cell in the RRC re-establishment mode, the method further includes:

determining that access to a network in a conditional handover mode fails

In an embodiment, if the terminal device accesses the target cell in the RRC re-establishment mode, on the premise that the source serving cell allocates reserved access resources for the terminal device, the terminal device is likely to execute the conditional handover before this, but the access to the network in the conditional handover mode fails.

Therefore, it can be seen from the above analysis that the handover report of the terminal device or the generated first information may also include one of the following:

a trigger condition of the conditional handover mode; and
duration from when the terminal device receives conditional handover configuration in formation to when conditional handover is executed, or time when the terminal device actually executes conditional handover.

In this embodiment, the trigger condition of the conditional handover mode may be that there is a situation that the RSRP of the potential target cell persistently higher than the RSRP of the source service cell a preset network configuration threshold within certain duration (trigger duration, that is, before the timer expires) after the terminal device receives the conditional handover configuration information.

In the application scenario of this embodiment, the handover report or the first information may be an RLF report with the following first type of information and/or second type of information on the basis of the original RLF report.

The first type of information is handover type indication information, that is, a type indication used to indicate whether the terminal executes a conditional handover or a traditional handover. If it is a conditional handover, the RLF report may further include: the trigger condition of the conditional handover and/or the duration from when the terminal device receives the conditional handover configuration information to when the conditional handover is executed.

The second type of information is a measurement result based on each synchronization signal block SSB and/or channel state information reference signal CSI-RS in the target cell selected for executing the conditional handover.

It can be understood that the selected target cell is the target cell of the conditional handover. Specifically, in this embodiment, until the terminal device executes CHO, the air interface signal quality (RSRP and/or RSRQ and/or SINR) of each SSB and/or CSI-RS reference signal or the IDs of the best N SSBs and/or CSI-RSs in the selected target cell or the ID of the SSB and or the CSI-RS with the an interface quality higher than the air interface quality threshold.

In an embodiment, the ID of each SSB and/or CSI-RS in the selected target cell can inform the index of the SSB/CSI-RS by setting the indicator bit, the air interface signal quality corresponding to each SSB and/or CSI-RS (RSRP and/or RSRQ and/or SINR) may be, for example, SSB1: ~60 dBm: SSB2: ~70 dBm: SSB3: ~75 dBm; SSB4: ~80 dBm, and the air interface quality threshold may be ~65 dBm, etc.

Further, in the embodiment of the present application, the handover report of the terminal device may further include: terminal motion track information and or location information, which can indicate the motion track information and/or actual location information of the terminal device in the process of executing the network handover.

In an embodiment of the present application, the handover report of the terminal device may further include: a random access process information report.

The random access process information report includes: a situation of random access using a different random access resource, and the situation of the random access comprises: an index value of a synchronization signal block SSB and/or a channel state information reference signal CSI-RS corresponding to a used random access resource, a number of a random access attempt executed on each random access resource, and each random access attempt information.

Exemplarily, the random access attempt information includes: indication information of whether a collision in the random access attempt is detected, and indication information of whether signal quality of an SSB and/or a CSI-RS corresponding to the random access attempt is greater than a preset signal quality threshold.

Specifically, the handover report reported by the terminal device may also include the situation that the terminal device executes the random access: for example, the number of random accesses executed under a certain beam, and the information about each random access: whether a collision is encountered after each random access attempt, whether the SSB quality of each random access attempt is higher than the RSRP threshold set by the system, etc.

It can be understood that the result of comparing the SSB quality of each random access attempt with the RSRP threshold set by the system will determine whether the terminal device can execute the contention free random access, or, in the case of contention based random access has been selected, determine whether the terminal device can randomly select a beam for the random access.

For example, the situation in which the terminal device executes the random access is as follows: if the terminal device executes contention based random access on SSB1 (the source network device does not reserve the resource for the terminal device to execute the contention free random access oriented to the SSB1), the random access preamble is sent 4 times, the terminal encounters collisions for the first three times, and the SSB quality of each random access attempt is higher than the RSRP threshold set by the system, etc.

It can be understood that the embodiment of the present application does not limit the specific content of the first information and/or the handover report, which can be determined according to actual conditions, and details are not repeated here.

Exemplarily, in this embodiment, before the above S304, the method may further include the following steps:
acquiring, by interacting with multiple potential network devices, access resources provided by multiple potential target cells that each terminal device is allowed to access.

In an embodiment, as shown in FIG. 4, the above S304 may be implemented by the following steps:

S403, the source network device determines a handover mode of each terminal device.

In the embodiment of the present application, after acquiring the first information of the at least one terminal device, the source network device acquires the handover type indication information included in each piece of first information and/or the handover report by analyzing the first information, further, the handover mode of each terminal device is determined according to the handover type indication information.

S404, the source network device determines a handover rule of the at least one terminal device according to the handover reports and the handover modes of ail the terminal devices.

Exemplarily, in this embodiment, by analyzing the handover reports of all terminal devices, the handover rule of the terminal device when accessing the network based on the adopted handover mode is determined. For example, which cell the at least one terminal device accesses, and which beam of the target cell is the access resource used, and the like.

S405, the source network device adjusts, according to the handover role of the at least one terminal device and/or access resources provided by the multiple potential target cells, a reserved resource allocated by the source network device to the terminal device in a serving cell.

In the embodiment of the present application, after determining the handover rule of the at least one terminal device, the source network device analyzes the access resources provided by the multiple potential target cells of each terminal device, determines whether the reserved resource allocated by the source network device for the terminal device is reasonable, and adjust the reserved resource allocated for the terminal device in the serving cell based on the analysis result to reduce the inappropriate reservation of the resource, and so that each terminal device have suitable resource to use when executing the handover.

In a possible design of the present application, step S405 may be implemented by the following steps:
when more than a first preset proportion of terminal devices in the at least one terminal device all access a first target cell after passing through the network device, adding an access resource provided by the network device corresponding to the first target cell to the reserved resource.

Exemplarily, in this embodiment, it is assumed that as many as 90% of the above-mentioned at least one terminal device access target cell 1 after passing through the source network device, which means that target cell 1 is the potential target cell for most terminal devices. At this time, the source network device will optimize itself. One way is to add the access resource provided by the network device corresponding to target cell 1 in the reserved resource, so as to improve the efficiency and success rate of the terminal device accessing the network.

In this possible design of the present application, the step S405 may further include the following steps:
when more than a second preset proportion of all terminal devices accessing the first target cell access the first target cell through a first beam, increasing a size of a resource on the first beam in the reserved resource, and/or, reducing a size of a resource on other beam within the first target cell in the reserved resource Exemplarily, in this embodiment, it is assumed that as many as 90% of the above-mentioned at least one terminal device access target cell 1 after passing through the source network device, and among all the terminal devices accessing target cell 1, as many as 90% of the terminal devices access target cell 1 through SSB1. At this time, the source network device will also optimize itself, and add the related access resource oriented to SSB1 for subsequent terminal devices. While reduce other unnecessary related access resources oriented to other SSBs and beams carrying other CSI-RSs, thereby reducing the allocation probability of the inappropriate resources and reducing resource waste.

It can be understood that the embodiments of the present application do not limit the specific values of the first preset proportion and the second preset proportion. Under normal circumstances, the first preset proportion and the second preset proportion may both be the values greater than 80%, for example, 85%, 90%, 95%, etc., the values of the first preset proportion and the second preset proportion may be the same or different. Which may be determined according to the actual scene, which is not limited in this embodiment of the present application.

In another possible design of the present application, this step S405 may be implemented by the following steps:
when less than a third preset proportion of terminal devices in the at least one terminal device all access a second target cell after passing through the network device, determining that an access resource provided by a network device corresponding to the second target cell is not included in the reserved resource, or, reducing an access resource provided by a network device corresponding to the second target cell in the reserved resource.

In this embodiment, it is assumed that as many as 90% of the above at least one terminal device access target cell 1 after passing through the source network device, for example, only less than 10% of the above at least one terminal device after passing through the source network device accesses target cell 2, which indicates that target cell 2 is only a potential target cell of a small number of terminal device. At this time, the source network device will optimize itself one way is to reduce the access resource provided by the network device of target cell 2 in the reserved resources, or, the terminal under the serving cell of the source network device will no longer be allocated the access resources of target cell 2, but only the regular measurement events to target cell 2 are configured for the terminal (for example, for traditional handover), so as to save the access resource overhead.

In yet another possible design of the present application, this step S405 may be implemented by the following steps:
when measurement results of each beam corresponding to the reserved resource by the at least one terminal device are all smaller than a preset signal quality threshold. While network handover is executed on a second beam in a CBRA mode, newly adding a resource size on the second beam in the reserved resource, wherein the second beam does not belong to a beam corresponding to the reserved resource.

In this embodiment, for some terminal devices, the potential target cell of the terminal device is target cell 1, and target cell 1 includes a total of 4 beams, namely SSB SSB2 SSB3 and SSB4. It is assumed that the source network device only allocates the access resources oriented to SSB3 and SSB4 of the target cell 1 to the terminal device, but the measurement results of far SSB3 and SSB4 by these terminal devices are relatively weak (for example, the signal quality is less than the preset signal quality threshold), and use SSB1 to execute the network handover in CBRA mode. In an embodiment, the network handover succeeds or fails (if it fails, the reason for the failure may be that the number of times the random access preamble is sent reaches the upper limit, etc.). Therefore, when receiving such a handover report from the terminal device, the source network device can subsequently configure the terminal device with the access resource oriented to SSB1.

In the resource processing method provided by the embodiment of the present application, after determining the reserved access resource allocated by the source serving cell for the terminal device, the terminal device executes from the source serving cell to the target cell, so that the generated first information can be sent out, in this way, the source network device can determine the handover mode of each terminal device based on the received first information sent by at least one terminal device, determine the handover rule of the at least one terminal device in combination with the handover reports of all terminal devices, and further adjust, according to the handover rule of at least one terminal device and/or the access resources provided by the multiple potential target cells, the reserved resources allocated by the source network device for the terminal devices in the served cell, so that when the source network device allocates the reserved resources for the terminal device, the allocation of inappropriate reserved resources can be reduced, and appropriate reserved resources can be provided, which solves the problem of resource waste or resource shortage caused by the inappropriate resource reservation for the terminal device in the prior art.

The technical solutions of the present application are described in detail above. The following will further illustrate with specific examples.

Figure 5:
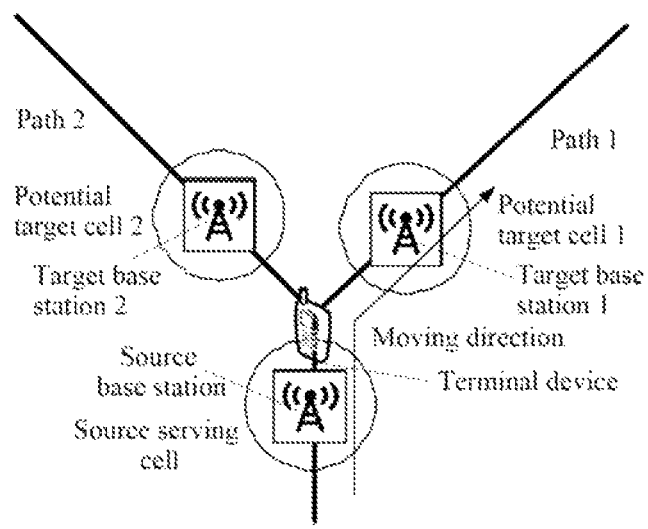
FIG. 5 is a schematic diagram of the movement of a terminal device according to an embodiment of the present application.

Exemplarily, FIG. 5 is a schematic diagram of the movement of a terminal device according to an embodiment of the present application. As shown in FIG. 5, the source base station (i.e., the above-mentioned source network device) configures the terminal with CHO access resource configuration oriented to two potential target base stations. In an embodiment, the two potential target base stations are divided into potential target base station 1 and potential target base station 2.

On the basis of the schematic diagram shown in FIG. 5, as a possible implementation mode 1, it is assumed that the terminal device accesses potential target base station 1 in conditional handover mode, and reports the CHO-related situation through the CHO report after accessing the target base station 1. Exemplarily, the CHO report may be the first information and/or the handover report in the foregoing embodiment.

In an embodiment, the CHO report may include at least one of the following:

A1, up to the moment to execute CHO, the IDs of other potential target cells and their cell wireless signal quality, in this embodiment, it is the RSRP and/or RSRQ and/or SINR of potential target base station 2;

A2, up to the moment to execute CHO, IDs of the target cell with the best cell wireless signal quality;

A3, up to the moment to execute CHO, the cells are sorted according to the maximum value of the reference signal quality, including the cell ID information and reference signal measurement result information, similar to the following description:

for each of the configured NR frequencies in which measurements are available:

if the SS/PBCH block-based measurement quantities are available, set the measResultListNR in measResultNeightCells to include all the available measurement quantities of the best measured cells, other than the source PCell, ordered such that the cell with highest SS/PBCH block RSRP is listed first if SS/PBCH block RSRP measurement results are available, otherwise the cell with highest SS/PBCH block RSRQ is listed first if SS/PBCH block RSRQ measurement results are available, otherwise the cell with highest SS/PBCH block SINR is listed first, based on the available SS/PBCH block based measurements collected up to the moment the UE detected radio link failure, for each neighbour cell included, include the optional fields that are available;

if the CSI-RS based measurement quantities are available, set the measResultListNR in measResultNeighCells to include all the available measurement quantities of the best measured cells, other than the source PCell, ordered such that the cell with highest CSI-RS RSRP is listed first if CSI-RS RSRP measurement results are available, otherwise the cell with highest CSI-RS RSRQ is listed first if CSI-RS RSRQ measurement results are available, otherwise the cell with highest CSI-RS SINR is listed first, based on the available CSI-RS based measurements collected up to the moment the UE detected radio link failure, for each neighbour cell included, include the optional fields that are available.

A4, terminal motion track information and/or location information;

A5, random access process information report.

In this embodiment, after receiving the CHO report, target base station 1 will report the CHO situation reported by the terminal device (for example, the downlink signal of the cell of the target base station 2 is too low) to the source base station, so that the source base station can summarize the information reported by the numerous terminal devices that execute CHO, and analyze its regularity.

Exemplarily, assuming that as many as 90% of the terminal devices access target cell 1 after passing through the source base station, the source base station will optimize itself, and a possible design is no longer to allocate the access resource of target cell 2 corresponding to target base station 2 for the terminal under the source base station cell service, and only configure the terminal with conventional measurement events to target cell 2 (e.g., prepared for traditional handover), so as to save the access resource overhead.

Figure 6:
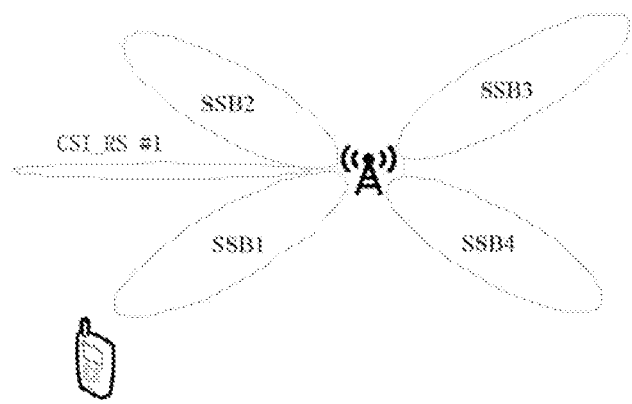
FIG. 6 is a schematic diagram of the distribution of beams included in a target cell.

As another possible implementation manner 2, based on the schematic diagram in FIG. 5, FIG. 6 is a schematic diagram of the distribution of the beams included in the target cell. It is assumed that the terminal device accesses the potential target base station 1 in the CBRA mode, and after accessing the target base station 1, reports the CHO-related situation through the CHO report.

In an embodiment, the CHO report may include the content explained in the above-mentioned possible implementation manner 1. For details, reference may be made to the record in the above-mentioned possible implementation manner, which will not be repeated here.

Since it is assumed that the target cell includes four beams from SSB1 to SSB4, on the basis of the above-mentioned possible implementation manner 1, the CHO report may further include the following content:

B1, when executing CHO, the ID of each SSB and/or CSI-RS in the selected target cell 1 (set the indicator bit to inform the index of the SSB/CSI-RS) and the corresponding air interface signal quality (RSRP and/or RSRQ and/or or SINR) (for example, SSB1: ~60 dBm; SSB2: ~70 dBm; SSB3: ~75 dBm; SSB4: ~80 dBm; the preset air interface quality threshold is ~65 dBm);

B2, the situation of executing the random access, for example, the contention based random access is executed on SSB1 (the source base station does not reserve the resource for the terminal device to execute the contention free random access oriented to SSB1); the random access preamble is sent 4 times, the terminal encounters collisions for the first three times, and the SSB quality of each random access attempt is higher than the RSRP threshold set by the system, etc.

Therefore, in this embodiment, similar to the above-mentioned possible implementations, after receiving the above-mentioned CHO report, target base station 1 will also report the CHO situation reported by the terminal device to the source base station, so that the source base station can summarize the information reported by the numerous terminal devices that execute CHO, and analyze its regularity.

In the above-mentioned possible design method 1, in addition to optimizing the access resources of the cell by the source network device, it is assumed that as many as 90% of the terminal device accesses target base station 1 through SSB1 of target base station 1. At this time, the source base station will also optimize itself, exemplarily, may add the related access resource oriented to SSB1 for subsequent terminal devices, while reduce other unnecessary related access resources oriented to other SSBs and beams carrying other CSI-RSs.

As yet another possible implementation mode 3, referring to FIG. 5 and FIG. 6, the source base station configures the terminal with the CHO access resource configuration oriented to potential target base station 1 and potential taint base station 2. In this possible implementation mode, the terminal device fails to access the target base station 1 in the CHO and/or the CBRA mode, but accesses the target base station 1 in the re-establishment mode. In this way, after accessing the target base station 1, the terminal device can report the CHO-related situation through the RLF report.

It can be understood that, in this possible implementation mode, the RLF report is equivalent to the first information or the handover report in the embodiments shown in FIG. 3 and FIG. 4 above.

In this possible implementation mode, the RLF report may include the following content in addition to the content included in the CHO report in the above-mentioned possible implementation mode 1 and/or possible implementation mode 2:

C1, handover type indication information, that is, the type indication of whether the terminal device executes the conditional handover or the traditional handover, which is used to indicate whether the terminal applies the conditional handover or the traditional handover,
if the terminal device executes the conditional handover, the RLF report also needs to include at least one of the following information, such as: the trigger condition of the conditional handover, the duration from when the terminal receives the conditional handover configuration to when the conditional handover is executed, or, the time to actually execute the conditional handover.

C2, when executing CHO, the air interface signal quality (RSRP and/or RSRQ and/or SINR) of each SSB and/or CSI-RS or the IDs of the best N SSBs and/or CSI-RSs in the selected target cell 1 or the ID of the SSB and/or the CSI-RS with the air interface quality higher than the air interface quality threshold.

In this embodiment, it is assumed that the source base station allocates the access resources oriented to SSB3 and SSB4 to the terminal device, but the measurement results for SSB3 and SSB4 by the terminal device are relatively weak (do not exceed the preset signal quality threshold), and the CBRA executed using SSB1 fails (the reason for the failure can be that the number of the random access preamble sent reaches the upper limit), etc. After receiving such a report, the source base station needs to subsequently configure access resources oriented to SSB1 for the terminal, so as to improve the success rate of the terminal device executing the conditional handover.

To sum up, the present application provides a resource processing method. When a terminal device accesses the network, the generated first information including the handover report can be sent out, enables the source network device to adjust the coverage and size of the resource pool reserved for the terminal in the conditional handover by receiving and analyzing the handover of the terminal device, which improves the matching degree between the reserved resources allocated for the terminal device and the terminal device, reduces the allocation probability of the inappropriate resources, and solves the problem of resource waste or shortage of resources.

The above describes the specific implementation of the resource processing method mentioned in the embodiments of the present application, and the following are the device embodiments of the present application, which can be used to execute the method embodiments of the present application. For details not disclosed in the device embodiments of the present application, please refer to the method embodiments of the present application.

Figure 7:
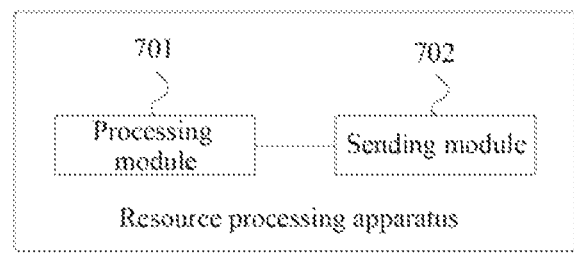
FIG. 7 is a schematic structural diagram of, a first embodiment of the resource processing apparatus provided by the present application.

FIG. 7 is a schematic structural diagram of a first embodiment of a resource processing apparatus provided by the present application. The device can be integrated in the terminal device, and can also be realized through the terminal device. As shown in FIG. 7, the apparatus may include: a processing module 701 and a sending module 702.

The processing module 701 is used to generate first information; where the first information includes: a handover report of the terminal device;
the sending module 702 is configured to send the first information, where the first information is used for the source network device of the terminal device to adjust a reserved resource according to the handover report.

In a possible design of the present application, the handover report includes: handover type indication information.

In another possible design of the present application, the first information further includes: handover type indication information.

Exemplarily, the handover mode indicated by the handover type indication information is one of the following:
a conditional handover mode and an unconditional handover mode;
or
the handover mode indicated by the handover type indication information is one of the following:

a traditional handover mode and a non-traditional handover mode.

In yet another possible design of the present application, the handover report includes at least one of the following:
a cell radio network temporary identifier C-RNTI allocated by a source serving cell for a terminal device;
an identifier of the source serving cell of the terminal device; and
measurement information of multiple potential target cells up to the moment of handover; or, measurement information of a cell on a configured new radio NR frequency up to the moment of handover.

Exemplarily, the measurement information includes at least one of the following:
signal quality of a cell and a corresponding cell identifier;
identifiers of N cells with best signal quality, where N is an integer greater than or equal to 1; and
identifiers and signal quality of cells sorted from high to low according to a maximum value of signal quality.

In an embodiment, the signal quality includes at least one of the following:
reference signal received power RSRP, reference signal received quality RSRQ and a signal to interference plus noise ratio SINR.

In another possible design of the present application, the processing module 701 is further configured to execute handover from a source serving cell to a target cell before generating the first information, where the source serving cell is the one served by the source network device cell, and the target cell is a cell served by the target network device.

Exemplarily, the processing module 701 is further configured to, before executing the handover from the source serving cell to the target cell, determine the reserved access resources allocated by the source serving cell to the terminal device, where the reserved access resources are: access resources provided by multiple potential target cells.

As an example, the processing module 701 is specifically configured to execute, based on the reserved access resources, the handover from the source serving cell to the target cell in a conditional handover mode.

As another example, the processing module 701 is specifically configured to execute the handover from the source serving cell to the target cell in CBRA mode, where the target cell is a cell with signal quality higher than or equal to a preset signal quality threshold.

In an embodiment, when the target cell is one of the multiple potential target cells, the target cell satisfies at least one of the following conditions:
the signal quality of an SSB or a CSI-RS reference signal corresponding to an unreserved resource in the target cell is higher than or equal to a preset signal quality threshold; and
the signal quality of the SSB or CSI-RS reference signal corresponding to a reserved resource in the target cell is less than the preset signal quality threshold.

As another example, the processing module 701 is specifically configured to access the target cell in an RRC re-establishment mode.

Exemplarily, the processing module 701 is further configured to, before the accessing the target cell in the RRC re-establishment mode, determine that access to a network in a conditional handover mode fails.

In this example, the handover report or the first information further includes one of the following:
a trigger condition of the conditional handover mode;
duration from when the terminal device receives the conditional handover configuration information to when the conditional handover is executed, or the time when the terminal device actually executes the conditional handover.

In another possible design of the present application, the handover report further includes:
a measurement result based on each synchronization signal block SSB and/or channel state information reference signal CSI-RS in a target cell.

In another possible design of the present application, the handover report further includes: terminal motion track information and/or location information.

In another possible design of the present application, the handover report further includes: a random access process information report;
the random access process information report comprises: a situation of random access using a different random access resource, and the situation of the random access comprises: an index value of a synchronization signal block SSB and/or a channel state information reference signal CSI-RS corresponding to a used random access resource, a number of a random access attempt executed on each random access resource, and each random access attempt information.

In an embodiment, the random access attempt information comprises: indication information of whether a collision in the random access attempt is detected, and indication information of whether signal quality of an SSB and/or a CSI-RS corresponding to the random access attempt is greater than a preset signal quality threshold.

In each of the above possible designs of the present application, the target network device and the source network device are the same network device.

In the above possible designs of the present application, the target network device and the source network device are different network devices; the sending module 702 is specifically configured to send the first information to the target network device, where the target network device is configured to forward the first information to the source network device.

The apparatus provided in this embodiment is used to implement the technical solutions on the terminal device side in the embodiments shown in FIG. 3 and FIG. 4, and the implementation principles and technical effects therebetween are similar, and are not repeated here.

Figure 8:
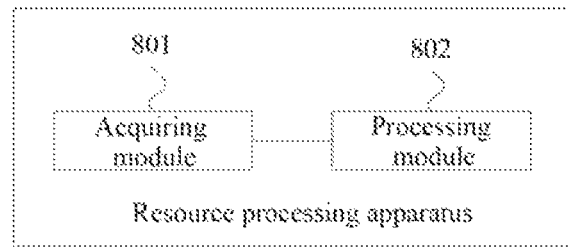
FIG. 8 is a schematic structural diagram of a second embodiment of the resource processing apparatus provided by the present application.

FIG. 8 is a schematic structural diagram of a second embodiment 2 of a resource processing apparatus provided by the present application. The device can be integrated in a network device or implemented through a network device. As shown in FIG. 8, the apparatus may include: an acquiring module 801 and a processing module 802.

The acquiring module 801 is configured to acquire at least one piece of first information sent by at least one terminal device, where each piece of first information comprises: a handover report of a corresponding terminal device; and;
the processing module 802 is configured to adjust a reserved resource allocated by the network device according to the handover report of the at least one terminal device.

In a possible design of the present application, the handover report includes: handover type indication information.

In another possible design of the present application, the first information further includes: handover type indication information.

Exemplarily, a handover mode indicated by the handover type indication information is one of the following:
a conditional handover mode and an unconditional handover mode;

or the handover mode indicated by the handover type indication information is one of the following:

a traditional handover mode and a non-traditional handover mode.

In yet another possible design of the present application, the handover report includes at least one of the following:

a cell radio network temporary identifier C-RNTI allocated by a source serving cell for a terminal device;
an identifier of the source serving cell;
measurement information of multiple potential target cells up to the moment of handover; or, measurement information of a cell on a configured new radio NR frequency up to the moment of handover.

In an embodiment, the measurement information includes at least one of the following:

signal quality of a cell and a corresponding cell identifier;
Identifiers of N cells with best signal quality, where N is an integer greater than or equal to 1; and
identifiers and signal quality of cells sorted from high to low according to a maximum value of signal quality.

Exemplarily, the signal quality includes at least one of the following:

reference signal received power RSRP, reference signal received quality RSRQ and a signal to interference plus noise ratio SINR.

In another possible design of the present application, when the at least one terminal device executes the conditional handover, the handover report further includes:

a measurement result based on each synchronization signal block SSB and/or channel state information reference signal CSI-RS in a target cell.

Exemplarily, the handover report further includes one of the following:

a trigger condition of the conditional handover mode;
duration from when the terminal device receives the conditional handover configuration information to when the conditional handover is executed, or time when the terminal device actually executes the conditional handover.

In another possible design of the present application, the handover report further includes: a random access process information report;

the random access process information report comprises:
a situation of random access using a different random access resource, and the situation of the random access comprises: an index value of a synchronization signal block SSB and/or a channel state information reference signal CSI-RS corresponding to a used random access resource, a number of a random access attempt executed on each random access resource, and each random access attempt information.

In an embodiment, the random access attempt information includes: indication information of whether a collision in the random access attempt is detected, and indication information of whether signal quality of an SSB and/or a CSI-RS corresponding to the random access attempt is greater than a preset signal quality threshold.

In another possible design of the present application, the handover report further includes: terminal motion track information and/or location information.

In another possible design of the present application, the acquiring module 801 is specifically configured to receive, through the receiving module, the at least one piece of first information forwarded by at least one target network device, wherein the at least one target network device is an access network device of the corresponding terminal device in the at least one terminal device.

In another possible design of the present application, the acquiring module 801 is further configured to, before adjusting the reserved resource allocated by the network device according to the handover report of the at least one terminal device by the processing module 802, acquire, by interacting with multiple potential network devices, access resources provided by multiple potential target cells that each terminal device is allowed to access In another possible design of the present application, the processing module 802 is specifically used for:

determining the handover mode of each terminal device;
determining the handover rule of the at least one terminal device according to the handover reports and handover modes of all terminal devices;
adjusting, according to the handover rule of the at least one terminal device and/or access resources provided by the multiple potential target cells, a reserved resource allocated by the network device to the terminal device in a served cell.

As an example, the processing module 802 is specifically configured to, when more than a first preset proportion of terminal devices in the at least one terminal device all access a first target cell after passing through the network device, add an access resource provided by the network device corresponding to the first target cell to the reserved resource.

Further, the processing module 802 is further specifically configured to, when more than a second preset proportion of all terminal devices accessing the first target cell access the first target cell through a first beam, increase a size of a resource on the first beam in the reserved resource, and/or, reduce a size of a resource on other beam within the first target cell in the reserved resource.

As another example, the processing module 802 is specifically configured to, when less than a third preset proportion of terminal devices in the at least one terminal device all access a second target cell after passing through the network device, determine that an access resource provided by a network device corresponding to the second target cell is not included in the reserved resource, or, reduce an access resource provided by a network device corresponding to the second target cell in the reserved resource.

As another example: the processing module 802 is specifically configured to, when the measurement results of each beam corresponding to the reserved resource by the at least one terminal device are all smaller than a preset signal quality threshold, while network handover is executed on a second beam in a CBRA mode, newly add a resource size on the second beam in the reserved resource, where the second beam does not belong to a beam corresponding to the reserved resource.

The apparatus provided in this embodiment is configured to implement the technical solutions on the network device side in the embodiments shown in FIG. 3 and FIG. 4, and the implementation principles and technical effects therebetween are similar, and details are not repeated here.

It should be rioted that the division of each module of the above apparatus is only a division of logical functions, and may be frilly or partially integrated into a physical entity in actual implementation, or may be physically separated. And these modules can all be implemented in the form of software calling through processing elements; they can also all be implemented in hardware; some modules can also be implemented in the form of calling software through processing elements, and some modules can be implemented in hardware. For example, the processing module may be a separately established processing element, or may be integrated into a certain chip of the above-mentioned device to be implemented, in addition, it may also be stored in the memory of the above-mentioned device in the form of program code, and a certain processing element of the above-mentioned device call and execute the function of the above determined module. The implementation of other modules is similar. In addition, all or part of these modules can be integrated together, and can also be implemented independently. The processing element described here ma be an integrated circuit with signal processing capability in the implementation process, each step of the above-mentioned method or each of the above-mentioned modules can be completed by an integrated logic circuit of hardware in the processor element or an instruction in the form of software.

For example, the above modules may be one or more integrated circuits configured to implement the above methods, such one or more application specific integrated circuits (ASIC), or one or more digital signal processor (DSP), or one or more field programmable gate arrays (FPGA), etc. For another example, when one of the above modules is implemented in the form of a processing element scheduler code, the processing element may be a general-purpose processor, such as a central processing unit (CPU) or other processors that can invoke program codes. For another example, these modules can be integrated together and implemented in the form of a system-on-a-chip (SOC).

In the above-mentioned embodiments, it may be implemented in whole or in part by software, hardware, firmware or any combination thereof. When implemented in software, it can be implemented in whole or in part in the form of a computer program product. The computer program product includes one or more computer instructions. When the computer program instructions are loaded and executed on a computer, all or part of the processes or functions described in the embodiments of the present application are generated. The computer may be a general purpose computer, special purpose computer, computer network, or other programmable device. The computer instructions may be stored in or transmitted from one computer-readable storage medium to another computer-readable storage medium, for example, the computer instructions may be downloaded from a website, computer, server, or data Transmission from the center to another website site, computer, server, or data center by wire coaxial cable, fiber optic, digital subscriber line (DSL)) or wireless (e.g., infrared, wireless, microwave, etc.). The computer-readable storage medium may be any available medium that can be accessed by a computer or a data storage device such as a server, data center, etc. that includes an integration of one or more available media. The usable media may be magnetic media (e.g., a floppy disk, a hard disk, a magnetic tape), optical media (e.g., at DVD), or semiconductor media (e.g., a solid state disk (SSD)), and the like.

Figure 9:
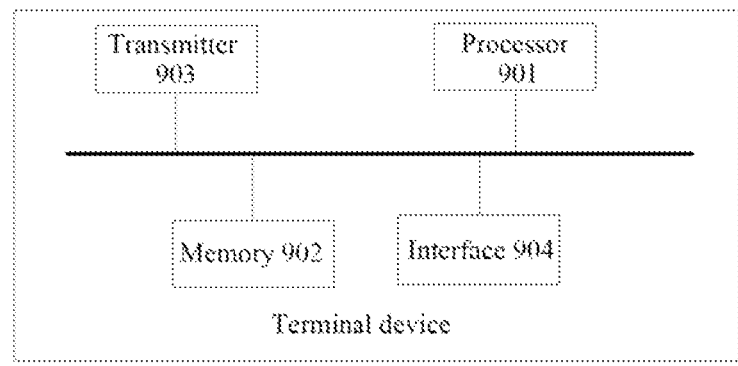
FIG. 9 is a schematic structural diagram of the terminal device provided by the present application.

FIG. 9 is a schematic structural diagram of a terminal device provided by the present application. As shown in FIG. 9, the terminal device may include: a processor 901, a memory 902, a transmitter 903, and an interface 904 for communicating with a network device.

The memory 902 stores computer execution instructions;
the processor 901 executes the computer-executed instructions stored in the memory 902, enabling the terminal device executes the technical solution on the terminal device side in the aforementioned embodiment shown in the FIG. 3 or FIG. 4.

Figure 10:
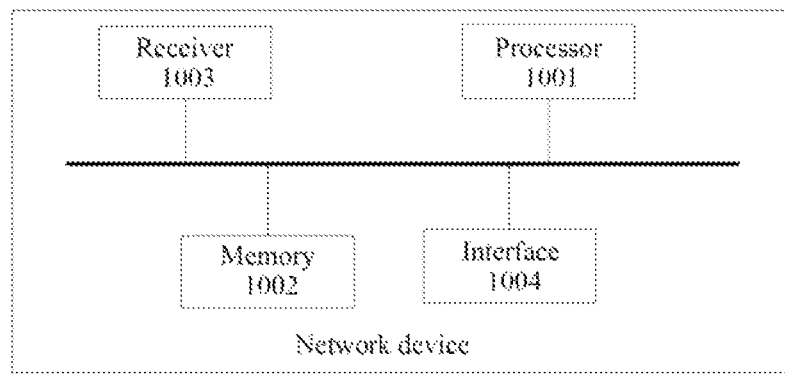
FIG. 10 is a schematic structural diagram of the network device provided by the present application.

FIG. 10 is a schematic structural diagram of a network device provided by this application. As shown in FIG. 10, the network device may include: a processor 1001, a memory 1002, a receiver 1003, and an interface 1004 for communicating with the terminal device.

The memory 1002 stores computer execution instructions;
the processor 1001 executes the computer-executed instructions stored in the memory 1002, enabling the network device executes the technical solution on the network device side in the aforementioned embodiment shown in FIG. 3 or FIG. 4.

It should be understood that the processor in this embodiment of the present application may be an integrated circuit chip, which has a signal processing capability. In the implementation process, each step of the above method embodiments may be completed by a hardware integrated logic circuit in a processor or an instruction in the form of software. The above-mentioned processor may be a general-purpose processor, a digital signal processor (DSP), an application specific integrated circuit (ASIC), a field programmable gate array (FPGA), or other programmable processors, a programming logic device, a discrete gate or transistor logic device, and a discrete hardware component.

It can be understood that the memory in this embodiment of the present application may be a volatile memory or a non-volatile memory, or may include both volatile and non-volatile memory. The non-volatile memory may be a read-only memory (ROM), a programmable read-only memory (PROM), an erasable programmable read-only memory (EPROM), an electrically programmable erase programmable read-only memory (electrically EPROM, EEPROM) or a flash memory. The volatile memory may be a random access memory (RAM), which acts as an external cache.

Figure 11:
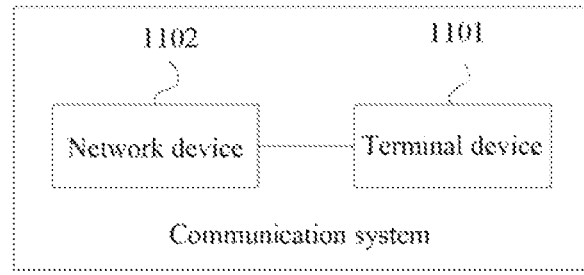
FIG. 11 is a schematic block diagram of the communication system provided by an embodiment of the present application.

FIG. 11 is a schematic block diagram of a communication system provided by an embodiment of the present application. As shown in FIG. 11, the communication system 1100 includes a terminal device 1101 and a network device 1102.

The terminal device 1101 can be used to implement the corresponding functions implemented by the terminal device in the above method, and the network device 1102 can be used to implement the corresponding functions implemented by the network device in the above method. For the specific implementation principles and beneficial effects of the terminal device and the network device, reference may be made to the descriptions in the foregoing embodiments, which will not be repeated here.

The present application also provides a computer-readable storage medium, where computer-executable instructions are stored in the computer-readable storage medium, and when the computer-executable instructions are executed by a processor, are used to implement the technical solution on the terminal device side in aforementioned embodiment shown in FIG. 3 or FIG. 4.

The present application also provides a computer-readable storage medium, where computer-executable instructions are stored in the computer-readable storage medium, and when the computer-executable instructions are executed by a processor, are used to implement the technical solution on the network device side in the aforementioned embodiment shown in FIG. 3 or FIG. 4.

The embodiment of the present application further provides a program. Which is used to execute the technical solution on the terminal device side in the aforementioned embodiment shown in FIG. 3 or FIG. 4 when the program is executed by the processor.

An embodiment of the present application further provides a program, which, when executed by a processor, is used to execute the technical solution on the network device side (base station) in the aforementioned embodiment shown in FIG. 3 or FIG. 4.

Embodiments of the present application further provide a computer program product, including program instructions, where the program instructions are used to implement the technical solution on the terminal device side in the aforementioned embodiment shown in FIG. 3 or FIG. 4.

Embodiments of the present application further provide a computer program product, including program instructions, where the program instructions are used to implement the technical solution on the network device side (base station) in the aforementioned embodiment shown in FIG. 3 or FIG. 4.

An embodiment of the present application further provides a chip, including: a processing module and a communication interface, where the processing module can execute the technical solution on the terminal device side in the aforementioned embodiment shown in FIG. 3 or FIG. 4.

Further, the chip also includes a storage module (e.g., a memory), the storage module is used for storing instructions, the processing module is used for executing the instructions stored in the storage module, and the execution of the instructions stored in the storage module enables the processing module to execute the technical solution on the terminal device side in the aforementioned embodiment shown in FIG. 3 or FIG. 4.

An embodiment of the present application further provides a chip, including: a processing module and a communication interface, where the processing module can execute the technical solution on the network device side in the aforementioned embodiment shown in FIG. 3 or FIG. 4.

Further, the chip also includes a storage module (e.g., a memory), the storage module is used for storing instructions, the processing module is used for executing the instructions stored in the storage module, and the execution of the instructions stored in the storage module enables the processing module to execute the technical solution on the network device side in the aforementioned embodiment shown in FIG. 3 or FIG. 4.

In the several embodiments provided in this application, it should be understood that the disclosed system, apparatus and method may be implemented in other manners. For example, the apparatus embodiments described above are only illustrative. For example, the division of the units is only a logical function division. In actual implementation, there may be other division methods. For example, multiple units or components may be combined or can be integrated into another system, or some features can be ignored, or not implemented. On the other hand, the shown or discussed mutual coupling or direct coupling or communication connection may be through some interfaces, indirect coupling or communication connection of devices or units, and may be in electrical, mechanical or other forms.

In the specific implementation of the above-mentioned user device and network device, it should be understood that the processor may be a central processing unit (CPU), or other general-purpose processors, digital signal processors (DSP), application specific integrated circuit (ASIC) and so on. A general purpose processor may be a microprocessor or the processor may be any conventional processor or the like. The steps in combination with the method disclosed in the present application can be directly embodied as executed by a hardware processor, or executed by a combination of hardware and software modules in the processor.

All or part of the steps for implementing the above method embodiments may be completed by program instructions related to hardware. The aforementioned program can be stored in a readable memory. When the program is executed, the steps including the above method embodiments are executed; and the aforementioned memory (storage medium) includes: a read-only memory (ROM), a RAM, a flash memory, a hard disk, a solid state drive, a magnetic tape, a floppy disk, an optical disc and any combination thereof.

What is claimed is:

1. A resource processing method, applied to a terminal device, the method comprises:
generating first information, wherein the first information comprises: a handover report of the terminal device; and
sending the first information, wherein the first information is used by a source network device of the terminal device to adjust a reserved resource according to the handover report, wherein the handover report or the first information comprises duration from when the terminal device receives conditional handover configuration information to when conditional handover is executed;
wherein the handover report comprises: handover type indication information; and a handover mode indicated by the handover type indication information is a conditional handover mode and an unconditional handover mode;
wherein the handover report further comprises at least one of the following: an index value of an SSB or a CSI-RS corresponding to a used random access resource, a number of a random access attempt executed on each random access resource, and each random access attempt information;
and the random access attempt information comprises at least one of the following: indication information of whether a collision in the random access attempt is detected, and indication information of whether signal quality of an SSB or a CSI-RS corresponding to the random access attempt is greater than a preset signal quality threshold.

2. The method according to claim 1, wherein the handover report comprises at least one of the following:
a cell radio network temporary identifier (C-RNTI) allocated by a source serving cell of the terminal device for the terminal device;
an identifier of a source serving cell of the terminal device; and
measurement information of multiple potential target cells up to the moment of handover; or, measurement information of a cell on a configured new radio (NR) frequency up to the moment of handover.

3. The method according to claim 2, wherein the measurement information comprises at least one of the following:
signal quality of a cell and a corresponding cell identifier;
identifiers of N cells with best signal quality, wherein N is an integer greater than or equal to 1; and
identifiers and signal quality of cells sorted from high to low according to a maximum value of signal quality.

4. The method according to claim 1, wherein the handover report further comprises at least one of the following:
a measurement result based on each synchronization signal block (SSB) or channel state information reference signal (CSI-RS) in a target cell.

5. The method according to claim 1, wherein the handover report further comprises at least one of the following: terminal motion track information or location information.

6. A resource processing method, applied to a network device, the method comprises:
acquiring at least one piece of first information sent by at least one terminal device, wherein each piece of first information comprises: a handover report of a corresponding terminal device; and
adjusting, according to the handover report of the at least one terminal device, a reserved resource allocated by the network device, wherein the handover report or the at least one piece of first information comprises duration from when the at least one terminal device receives conditional handover configuration information to when conditional handover is executed;
wherein the handover report comprises: handover type indication information; and a handover mode indicated by the handover type indication information is a conditional handover mode and an unconditional handover mode;
wherein the handover report further comprises at least one of the following: an index value of an SSB or a CSI-RS corresponding to a used random access resource, a number of a random access attempt executed on each random access resource, and each random access attempt information; and
wherein the random access attempt information comprises at least one of the following: indication information of whether a collision in the random access attempt is detected, and indication information of whether signal quality of an SSB or a CSI-RS corresponding to the random access attempt is greater than a preset signal quality threshold.

7. The method according to claim 6, wherein the handover report comprises at least one of the following:
a cell radio network temporary identifier (C-RNTI) allocated by a source serving cell for a terminal device;
an identifier of a source serving cell; and
measurement information of multiple potential target cells up to the moment of handover; or, measurement information of a cell on a configured new radio (NR) frequency up to the moment of handover.

8. The method according to claim 7, wherein the measurement information comprises at least one of the following:
signal quality of a cell and a corresponding cell identifier;
identifiers of N cells with best signal quality, wherein N is an integer greater than or equal to 1; and identifiers and signal quality of cells sorted from high to low according to a maximum value of signal quality.

9. A terminal device, comprising:
a processor, a memory, a transmitter, and an interface to communicate with a network device;
the memory stores computer-executable instructions;
the processor executes the computer-implemented instructions stored in the memory, enabling the terminal device to execute the following steps:
generating first information, wherein the first information comprises: a handover report of the terminal device; and
sending the first information, wherein the first information is used by a source network device of the terminal device to adjust a reserved resource according to the handover report, wherein the handover report or the first information comprises duration from when the terminal device receives conditional handover configuration information to when conditional handover is executed;
wherein the handover report comprises: handover type indication information; and a handover mode indicated by the handover type indication information is a conditional handover mode and an unconditional handover mode;
wherein the handover report further comprises at least one of the following: an index value of an SSB or a CSI-RS corresponding to a used random access resource, a number of a random access attempt executed on each random access resource, and each random access attempt information; and
wherein the random access attempt information comprises at least one of the following: indication information of whether a collision in the random access attempt is detected, and indication information of whether signal quality of an SSB or a CSI-RS corresponding to the random access attempt is greater than a preset signal quality threshold.

10. A network device, comprising:
a processor, a memory, a receiver, and an interface to communicate with terminal device;
the memory stores computer-executable instructions;
the processor executes the computer-implemented instructions stored in the memory, enabling the network device to execute the method according to claim 6.

11. A non-transitory computer-readable storage medium, wherein computer-executable instructions are stored in the computer-readable storage medium, and when the computer-executable instructions are executed by a processor, are used to implement method according to claim 1.

12. A non-transitory computer-readable storage medium, wherein computer-executable instructions are stored in the computer-readable storage medium, and when the computer-executable instructions are executed by a processor, are used to implement the method according to claim 6.

* * * * *